United States Patent [19]

Sakakibara et al.

[11] Patent Number: 5,478,288
[45] Date of Patent: Dec. 26, 1995

[54] AUTOMATIC POWER TRANSMISSION OF AUTOMOTIVE VEHICLE

[75] Inventors: Satoshi Sakakibara, Yamato; Tatsuo Wakahara, Kawasaki, both of Japan

[73] Assignee: Nissan Motor Co., Ltd., Yokohama, Japan

[21] Appl. No.: 191,474

[22] Filed: Feb. 4, 1994

[30] Foreign Application Priority Data

Feb. 16, 1993 [JP] Japan .................................. 5-026649
Feb. 17, 1993 [JP] Japan .................................. 5-028053
Feb. 22, 1993 [JP] Japan .................................. 5-031993

[51] Int. Cl.$^6$ .................................................. F16H 59/36
[52] U.S. Cl. ............................................ 475/129; 475/120
[58] Field of Search ...................................... 475/120, 129

[56] References Cited

U.S. PATENT DOCUMENTS 4,125,038  11/1978  Hiramatsu .............................. 475/129
5,111,719   5/1992  Okahara ................................. 475/129

FOREIGN PATENT DOCUMENTS 4-050734  2/1992  Japan .

OTHER PUBLICATIONS

Japanese Service Manual, "Nissan Maxima New Model Explanation Book J30 Type Series, Introduction of Vehicle Modified Points", (Aug. 1991).

*Primary Examiner*—Dirk Wright
*Attorney, Agent, or Firm*—Foley & Lardner

[57] ABSTRACT

An automatic power transmission of an automotive vehicle includes various frictional elements and frictional brakes and can prevent a shift shock from occurring by increasing a working hydraulic pressure applied to a certain frictional element (forward clutch F/C) so as to make fast a reengagement of the certain frictional element when a down-shifting from a high gear speed range to a low gear speed range occurs. In a preferred embodiment, the working hydraulic pressure present during the down-shifting is introduced into an accumulator so as to disable a stroke of the accumulator. In another preferred embodiment, a time at which a shifting solenoid (A) is turned from its ON state to its OFF state is retarded after a control valve control solenoid (C) is turned from its OFF state to its ON state in response to an instruction of a controller to shift down the gear speed range. In addition, a fuel consumption of the associated engine is improved by an extension of a lock-up interval off a torque converter.

12 Claims, 10 Drawing Sheets

| ELEMENT | B/B | | | H/C | F/C | FO/C | OR/C | LO/C | LR/B | R/C |
|---|---|---|---|---|---|---|---|---|---|---|
| | 2A | 3R | 4A | | | | | | | |
| REVERSE | | | | | | | | | ○ | ○ |
| FORWARD 1st-RANGE | ○ | | | | ○ | ○ | △ | ○ | △ | |
| FORWARD 2nd-RANGE | ○ | | | | ○ | ○ | △ | | | |
| FORWARD 3rd-RANGE | ○ | ○ | | ○ | ○ | ○ | △ | | | |
| FORWARD 4th-RANGE | | ○ | ○ | ○ | (○) | | | | | |

| GEAR SHIFT RANGE \ SHIFTING SOLENOID | A | B |
|---|---|---|
| 1st | ON | ON |
| 2nd | OFF | ON |
| 3rd | OFF | OFF |
| 4th | ON | OFF |

AUTOMATIC POWER TRANSMISSION OF AUTOMOTIVE VEHICLE

BACKGROUND OF THE INVENTION

1. Field of the Invention

The present invention generally relates to an automatic power transmission of an automotive vehicle and, more particularly, relates to a gear speed range shift control apparatus of the automatic power transmission used together with a device which prevents a friction generated on a one way clutch installed in a power transmission train of the automatic power transmission.

2. Description of the Background Art

An automatic power transmission selects one of gear shift speed ranges according to a selective hydraulic (working pressure) operation (engagement) of various types of frictional elements (frictional clutch and/or frictional brakes) and performs a gear shifting of the present gear shift speed range to the other gear shift range according to a change of the operating frictional elements.

When an up-shifting of the gear speed range from a low gear speed range to a high gear speed range occurs, a power transmission at the low gear speed range is carried out via a one way clutch so that the up-shifting of the gear speed range to the high gear speed range is completed through of an overrun of the one way clutch. At this time, the overrun of the one way clutch is preferable as a countermeasure against an occurrence of a gear shift shock. Currently, many automatic power transmissions have adopted this countermeasure.

A Japanese Service Manual titled "NISSAN MAXIMA NEW MODEL EXPLANATION BOOK J30 TYPE SERIES, INTRODUCTION OF VEHICLE MODIFIED POINTS" published in August, 1991 exemplifies the above-described automatic transmission.

In the disclosed Japanese Service Manual identified above, the automatic transmission includes a forward one way clutch corresponding to the one way clutch described above, the forward one way clutch being engaged so as to contribute to the power transmission at the time of the gear speed ranges from a 1st speed range to a 3rd speed range and being in an overrun state at the time when the gear shift occurs to the fourth (4th) speed range, the gear shifting to the 4th speed range being carried out with a band brake additionally operated in the 3rd speed range selected state so that the gear range shift can smoothly be executed.

However, since, at the 4-th gear speed range, outer and inner laces of the forward one-way clutch are left coupled to separate rotation members, respectively, the rotation members being independently and separately rotated, a friction of the one way clutch involved with the relative rotations between the outer and inner laces cannot be avoided and can cause an increased power loss, thus introducing a wasteful fuel consumption of the associated engine.

SUMMARY OF THE INVENTION

It is, therefore, an object of the present invention to provide an automatic power transmission of an automotive vehicle having an apparatus for controlling a gear speed range shift which can avoid the occurrence of the friction of the one way clutch at a fourth (4th) gear speed range of the transmission and can save a fuel consumption caused by the friction on the one way clutch and, furthermore, which can avoid occurrences of a temporary neutral state and of a shift shock of the automatic power transmission during a down shifting from a high gear speed range to a low gear speed range.

The above-described object can be achieved by providing an automatic power transmission for an automotive vehicle, comprising: a) a certain frictional element; b) a one way clutch; c) an accumulator; d) an engine braking frictional element; e) gear speed range shifting means for shifting a gear speed range between a higher gear shift range and a lower gear shift range, said gear speed range shifting means having: first means for selectively setting the lower speed gear shift range in which an engine output power is transmitted via said certain frictional element and said one way clutch when said frictional element is engaged under a hydraulic pressure such that said accumulator serves to slow a pressure raising speed toward said certain frictional element; second means for enabling the engine braking at the low gear shift range when the engine braking frictional element is engaged which is juxtaposed to said one way clutch in the low gear speed range selected state; third means for enabling the high gear shift range to be selected when said one way clutch overruns with another frictional element engaged in the low gear shift range selected state; and fourth means for releasing the engagement of said certain frictional element in the high gear shift range so as to prevent a friction to be generated on the one way clutch; and f) fifth means for increasing a rate of raising the hydraulic pressure to said certain frictional element so as to make fast a reengagement of said certain frictional element and so as not to provide a temporary neutral state in the automatic power transmission when a down shifting from the high gear shift range to the low gear shift range occurs.

The above-described object can also be achieved by providing an automatic power transmission for an automotive vehicle, comprising: a) a forward clutch; b) a forward one way clutch; c) an accumulator; d) an engine braking frictional element; e) gear speed range shifting means for shifting a gear speed range between a higher gear shift range and a lower gear shift range, said gear speed range shifting means having: first means for selectively setting the lower speed gear shift range in which an engine output power is transmitted via said forward clutch and said forward one way clutch when said forward clutch is engaged under a hydraulic pressure such that said accumulator serves to slow a pressure raising speed toward said forward clutch; second means for enabling the engine braking at the low gear shift range when the engine braking frictional element is engaged which is juxtaposed to said forward one way clutch in the low gear speed range selected state; third means for enabling the high gear shift range to be selected when said forward one way clutch overruns with another frictional element engaged in the low gear shift range selected state; and fourth means for releasing the engagement of said forward clutch in the high gear shift range so as to prevent a friction to be generated on the forward one way clutch; and f) fifth means for making earlier a timing at which said forward clutch is engaged than a timing at which a down shift to the low gear shift range is advanced when a down shifting from the high gear shift range to the low gear shift range occurs.

DETAILED DESCRIPTION OF THE PREFERRED EMBODIMENTS

Reference will, hereinafter, be made to the drawings in order to facilitate a better understanding of the present invention.

Before explaining a first preferred embodiment according to the present invention, a previously proposed gear speed range control apparatus disclosed in a Japanese Patent Application No. Heisei 4-50734 will be explained briefly with reference to FIG. 9.

In the above Japanese Patent Application, a certain frictional element (forward clutch) used for a lower gear speed range shift selection which is related to a one way clutch is released since this frictional element does not participate in the power transmission at a fourth gear speed range in order to avoid the generation of friction on the one way clutch.

However, when such a countermeasure as releasing the certain frictional element (forward clutch) for the lower speed range shift selection is carried out at the fourth speed range (high gear shift range), the engagement of the certain frictional element tends to be delayed when the down-shifting occurs from a high speed range to a low gear speed range at which the certain frictional element is to be engaged, since a cylinder capacity of the certain frictional element is large due to its lower speed gear range use and an accumulator is disposed in a working pressure (hydraulic) circuit of the certain frictional element so as to prevent the occurrence of gear shift shocks. In addition, the following problems would occur.

Figure 9:
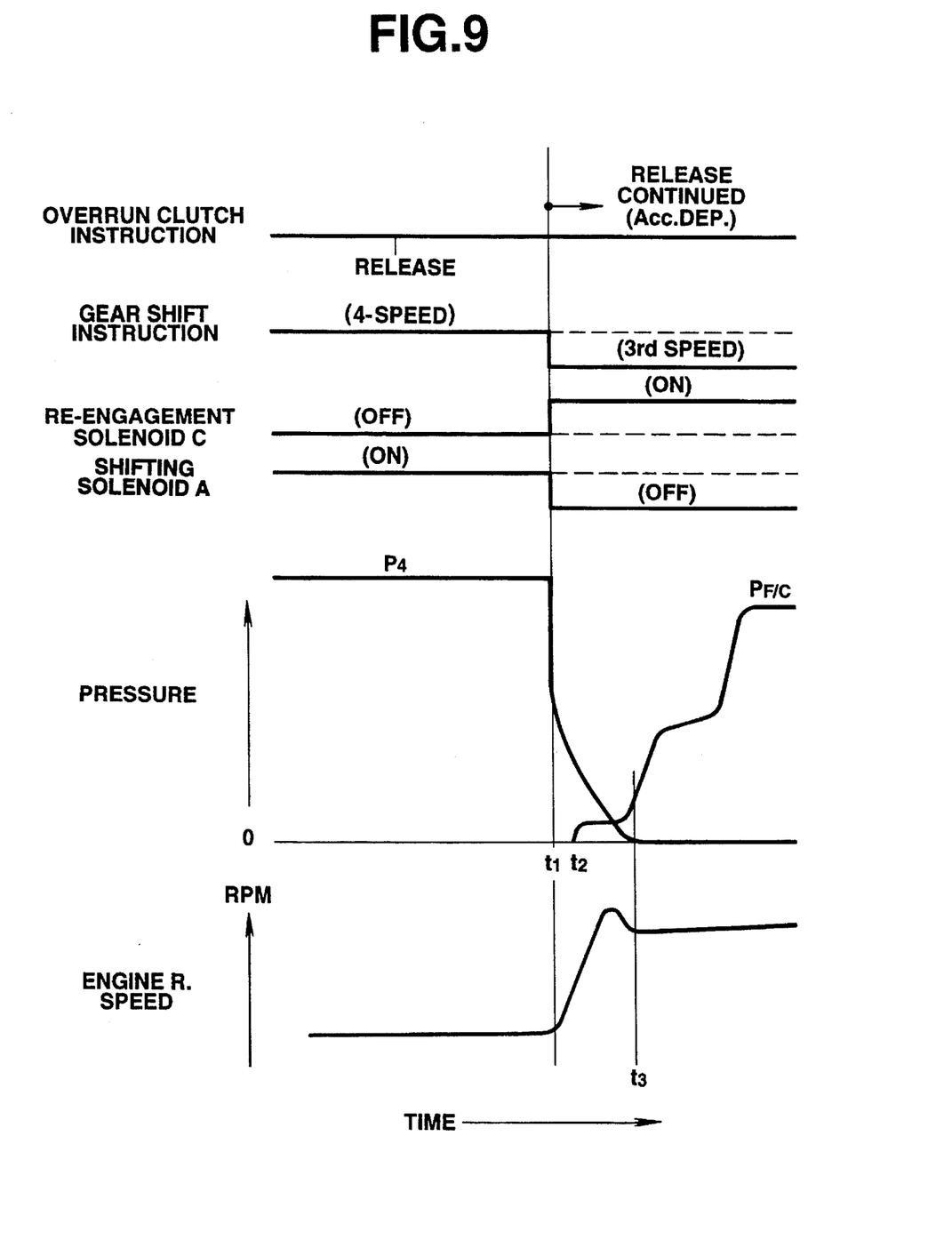
FIG. 9 is a gear shift operation timing chart for explaining the gear shift operation disclosed in a Japanese Patent Application filing No. Heisei 4-50734.

As shown in FIG. 9, a fourth speed range working pressure $P_4$ is reduced from an instant in time $t_1$ at which a down-shift instruction is issued by a controller to shift the gear speed range from the 4-th speed range to the 3-rd speed range and, thereafter, at an instant in time $t_2$, a forward clutch pressure $P_{F/C}$ is increased. However, it is unavoidable for the forward clutch to delay its engagement due to the above-described reasons, so that the automatic transmission is instantaneously in a neutral state during the gear speed range down-shift. On the other hand, since the down-shift usually occurs during the vehicle run in a power-on mode in which an engine accelerator pedal is depressed, the engine becomes idling and runs excessively with the accelerator pedal depressed immediately before an instant in time $t_3$ at which the forward clutch engagement is started as shown in FIG. 9, so that the actual gear shifting delay occurs and a large gear shift shock occurs along with the temporary engine idling with the accelerator pedal depressed.

Furthermore, when the certain frictional element is released, a signal pressure performing a stroke control for a valve to execute this release needs always to be zero during the high gear speed range. A basic pressure of this signal pressure needs to be continued to be drained during the high speed gear range selected state. This drain causes an environment of supplying and draining of a working fluid (oil quantity) through an oil pump driven by means of the engine to be strict during, particularly, a low vehicle speed since the engine revolution speed is low during the selection of high speed gear. Further, it is inevitably necessary to set a lower limit vehicle speed, above which a lock-up region of a torque converter of the automatic power transmission is prepared, to be higher. In addition, since the lower limit vehicle speed of the lock-up region causes a furthermore reduction of an engine revolution speed, the lower limit vehicle speed needs to be set higher. Hence, the lock-up region accordingly becomes narrower and a lockup interval becomes short which directly couples both input and output elements of the torque converter. A large fuel saving due to the lock up of the torque converter cannot be expected any more.

(First Preferred Embodiment)

In the first embodiment, from a viewpoint that the engagement delay of the certain frictional element (forward clutch) for the low gear speed range selection is mainly based on a stroke of an accumulator disposed in a hydraulic circuit connected to the certain frictional element, a countermeasure such that no stroke of the accumulator is generated during a down-shifting of the gear speed range to the low gear speed range is taken.

Figure 1A:
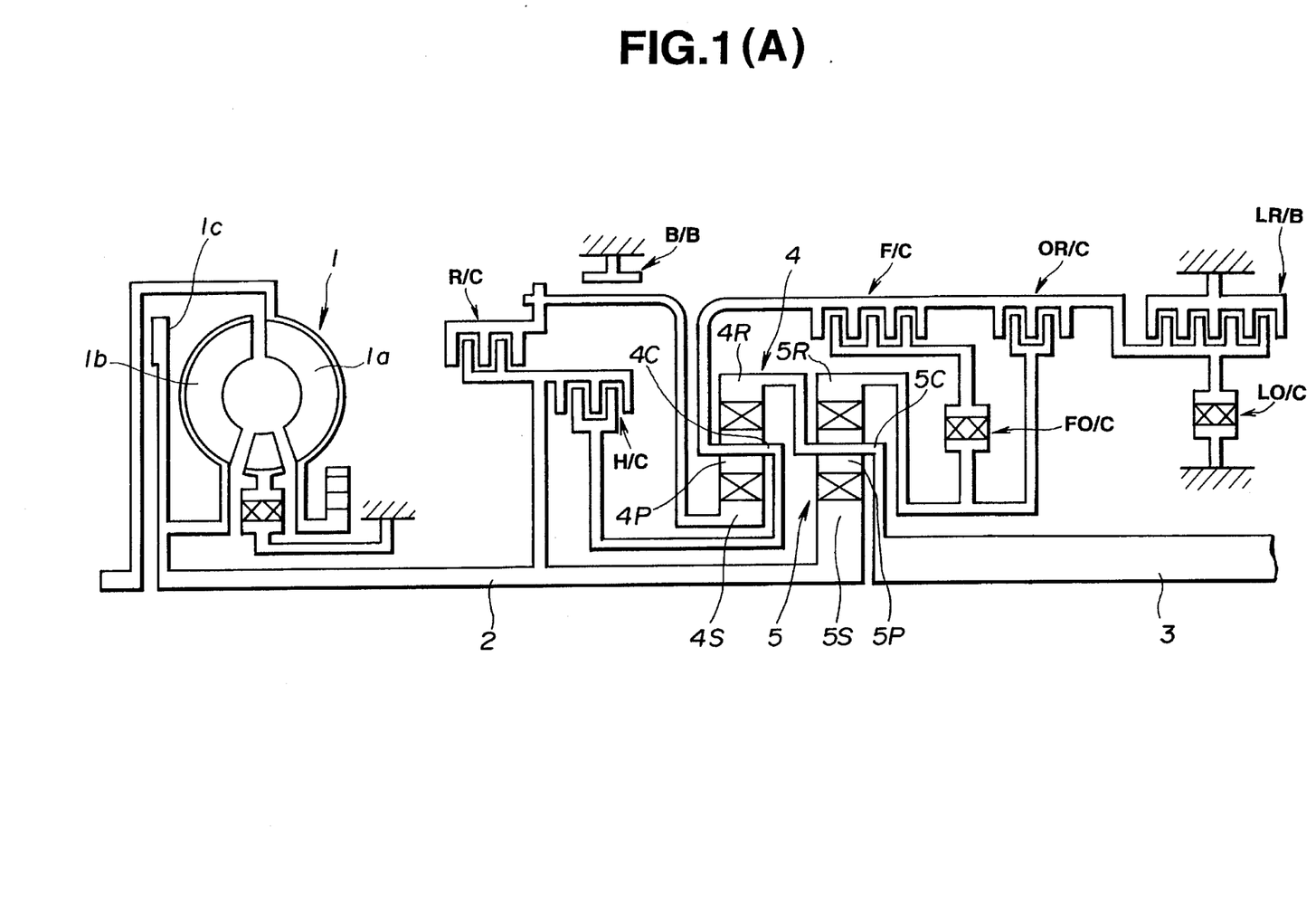
FIG. 1(A) is a power transmission train of an automatic power transmission to which a gear speed range shift control apparatus according to the present invention is applicable.
Figure 1B:
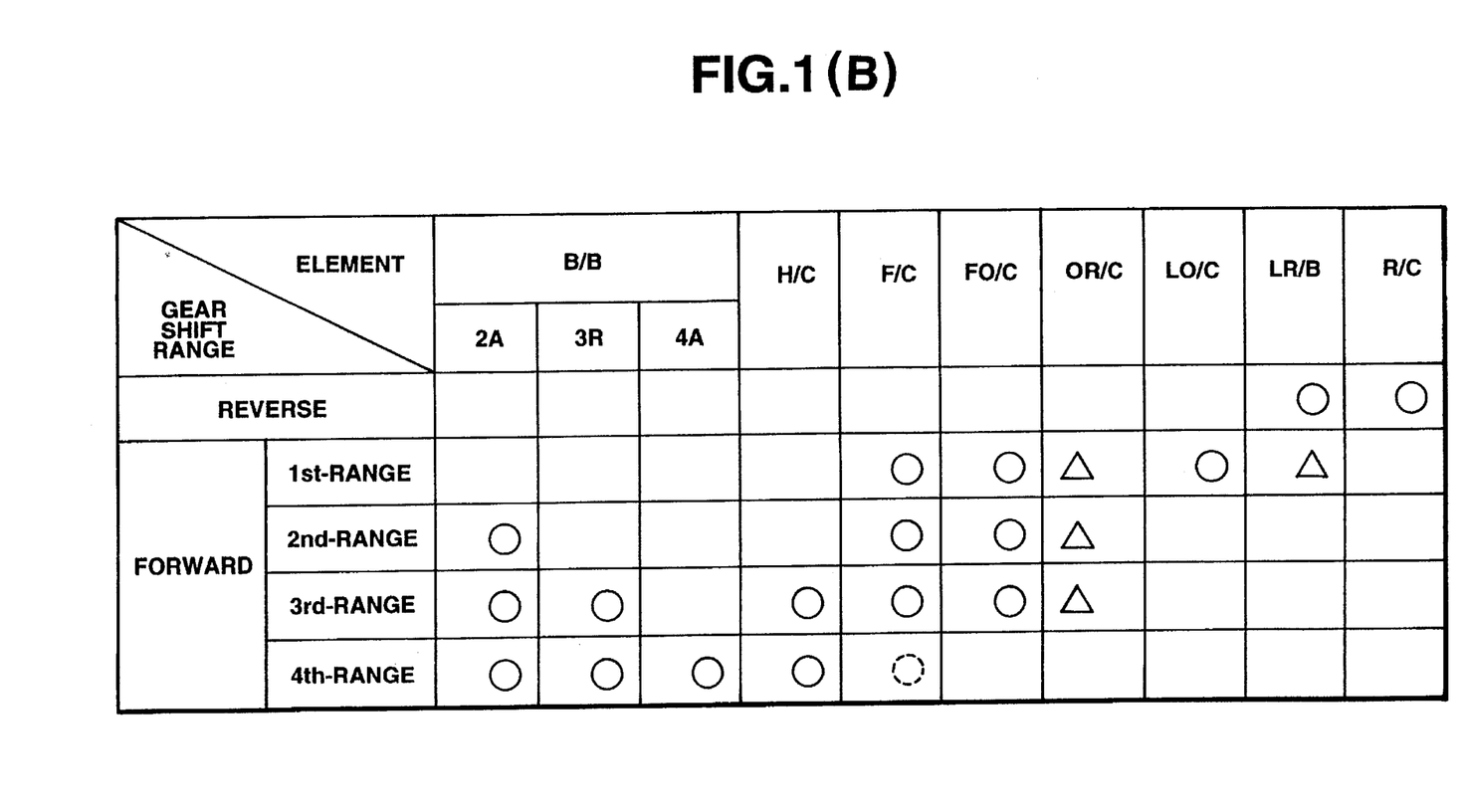
FIG. 1(B) is an explanatory view of an engagement logic table of various types of frictional elements used in the gear speed range shift control apparatus shown in FIG. 1 (A).

FIGS. 1(A) and 1(B) respectively show a power transmission train of the automatic power transmission (A/T) to which the gear speed control apparatus according to the present invention is applicable, and an engagement logic table for various types of frictional elements.

It is noted that FIG. 1(A) is the same as is disclosed in the Japanese New Model Service Manual (supplement version I) titled NISSAN MAXIMA introduction of modifications of J30 type series model (J30-2) published in August, 1991.

The transmission power train includes a torque converter 1, an input axle 2 to which a rotation power from an engine crankshaft is transmitted via the torque converter 1, an output axle 3 which is coaxial with the input axle 2, a first planetary gear group 4 and a second planetary gear group 5 coaxially arranged on these input and output axles 2 and 3, and various frictional elements to be described later.

The torque converter 1 includes a pump impeller (input element) 1a driven by the engine; turbine runner (output element) 1b; and a lock-up clutch 1c.

The engine power is transmitted to the input axle 2 usually by a fluid drive of the output element 1b under an increase in torque to the output element 1b via an inner working fluid by means of the input element 1a. When by an engagement of the lock-up clutch 1c both the input element and output element 1a and 1b are directly coupled (locked-up), the engine output power is mechanically and directly transmitted to the input axle 2.

The first planetary gear group 4 includes a normal simple planetary gear group having a sun gear 4S, a ring gear 4R, a pinion 4P meshed with these gears 4S and 4R, and a carrier 4C rotatably supporting the pinion 4P.

The second planetary gear group 5 includes a simple planetary gear group having a sun gear 5S, a ring gear 5R, a pinion 5P, and a carrier 5C.

Next, the various frictional elements which carry out the gear speed range control will be explained below.

The carrier 4C is appropriately capable of coupling with the input axle 2 via a high clutch H/C and the sun gear 4S is appropriately capable of fixing by means of a band brake B/B. In addition, the sun gear 4S is appropriately capable of coupling to the input axle 2 by means of a reverse clutch R/C. The carrier 4C is appropriately capable of fixing furthermore by means of a multi-plate type low reverse brake LR/B. Then, the carrier 4C blocks a reverse rotation thereof via a low one way clutch LO/C (reverse rotation to the engine rotation).

The ring gear 4R is integrally coupled to the carrier 5C and drivenly coupled to the output axle 3 so that the sun gear 5S is coupled and attached onto the input axle 2. The ring gear 5R is appropriately coupled to the carrier 4C via the overrun clutch OR/C. In addition, the ring gear 5R is correlated to the carrier 4C via a forward one way clutch FO/C and a coupled forward clutch F/C. The forward one way clutch FO/C is coupled to the carrier 4C at a reverse direction of the ring gear 5R with the forward clutch F/C coupled (reverse direction to the engine).

The high clutch H/C, reverse clutch R/C, low reverse brake LR/B, overrun clutch OR/C, and forward clutch F/C are operated according to the supply of predetermined hydraulic pressures thereto, respectively, so that the appropriate couplings and fixings described above are carried out.

The band brake B/B, particularly as shown in the table of FIG. 1(B), includes a 2nd-speed servo apply chamber 2A, a 3rd-speed servo release chamber 3R, and a 4-th-speed servo apply chamber 4A. The band brake B/B is open in a steady-state condition, is engaged by means of a pressure supply only to the chamber 2A, is open when the pressure is supplied to the two chambers 2A and 3R, and is engaged when the pressure is supplied to the three chambers 2A, 3R, and 4A.

The power transmission train shown in FIG. 1(A) is operated (denoted by o in FIG. 1(B)) by various combinations of the frictional elements B/B, H/C, F/C, OR/C, LR/B, and R/C as shown in the table shown in FIG. 1(B) so that together with the appropriate operations (engagements) of the frictional elements FO/C and LO/C, rotation states of the elements constituting the planetary gear groups 4 and 5 are changed, thus changing a rotation speed ratio of the output axle 3 with respect to the input axle 2. Consequently, the gear speed ranges of forward 4 speeds, and reverse 1 speed can be obtained.

A symbol Δ in FIG. 1(B) denotes the operation (a hydraulic pressure inflow) as well as the symbol o.

However, the symbol Δ denotes the frictional element to be operated during the demand for the engine braking. While the overrun clutch OR/C is operated as denoted by Δ, the juxtaposed forward one-way clutch FO/C is disabled to be released so as to enable the engine braking. While the low reverse brake LR/B is operated, the juxtaposed low one way clutch LO/C is disabled to be released to enable the engine braking.

Furthermore, a symbol o in FIG. 1(B) denotes a state in which the forward clutch (F/C) is left engaged for the convenience of the gear speed range control hydraulic pressure circuit irrespective of no participation of the corresponding clutch to the power transmission at the 4th gear speed range. In this case, an outer lace of the forward one way clutch FO/C is driven at the same speed as the input axle rotation. A relative rotation of the outer lace to the inner lace which is rotating incrementally is present so that a wasteful fuel consumption due to the friction of the forward one way clutch FO/C is generated.

Then, in the first embodiment, the outer lace of the one way clutch FO/C can rotate and follow up the inner lace thereof by an in operation (release) of the forward clutch F/C caused by the drain of the working pressure at the fourth gear speed range so that the friction on the one way clutch is prevented, thus improving the fuel consumption.

Figure 2:
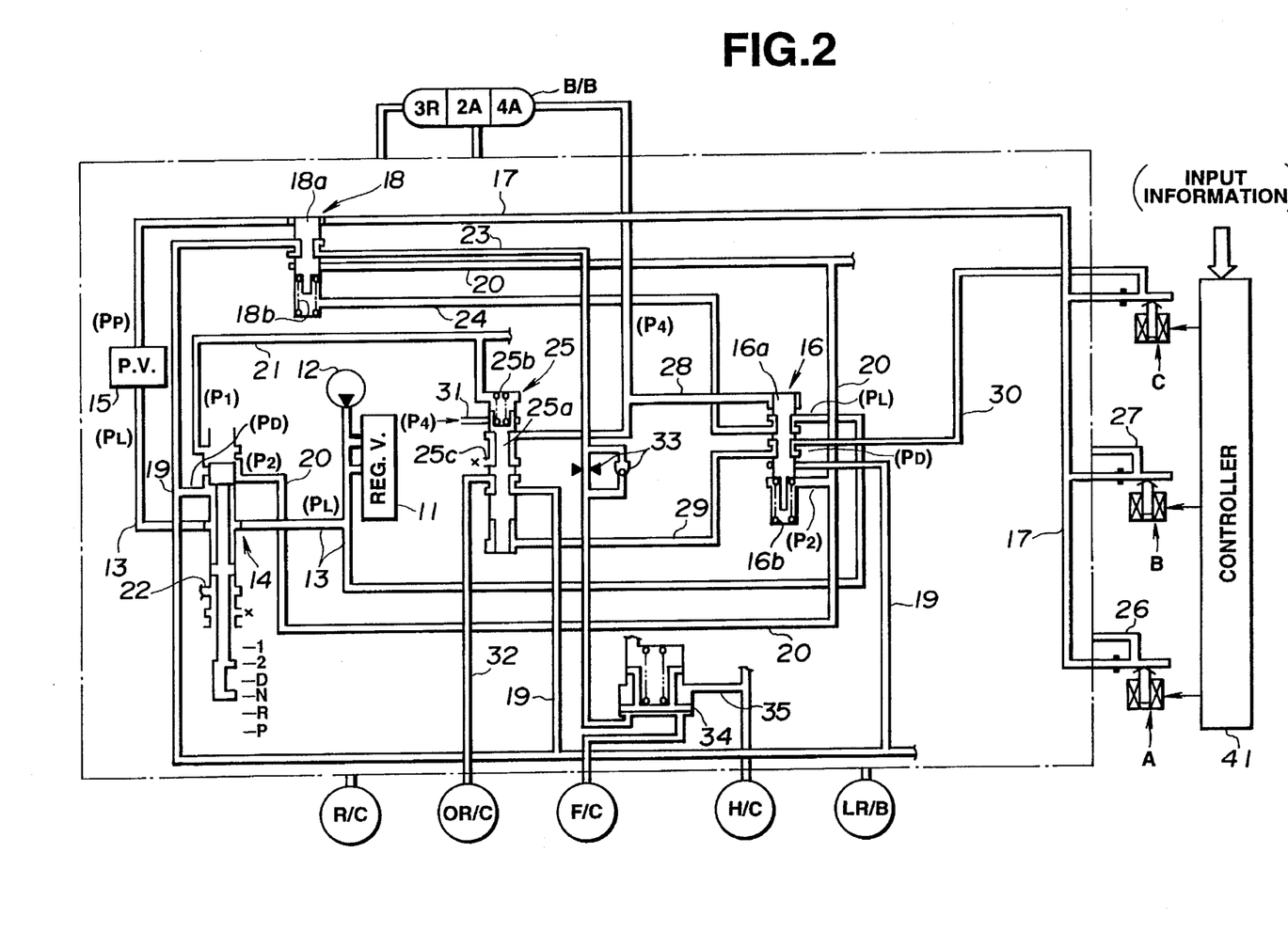
FIG. 2 is a hydraulic circuit diagram of a gear speed range shift control apparatus in the power transmission train indicating only a related portion to the present invention in a first preferred embodiment according to the present invention.

To this purpose, the gear range control hydraulic circuit for the power transmission train shown in FIG. 1(A) is constructed as shown in FIG. 2.

The gear range control hydraulic circuit is the same as that described in the above-identified Japanese Service Manual, but a part related to the present invention is shown in FIG. 2.

A regulator valve 11 serves to adjust a working oil derived from an oil pump 12 to a regulated line pressure $P_L$ having a predetermined line pressure according to a well known action, the regulated line pressure $P_L$ being output to a circuit 13 and used as a basic pressure for all elements of the automatic power transmission. The regulated line pressure $P_L$ is supplied to a manual valve 14, a pilot valve 15, and a switch valve 16. The pilot valve 15 serves to reduce the line pressure $P_L$ to a constant pilot pressure $P_p$. This pilot pressure $P_p$ is supplied to a forward clutch control valve 18, shifting solenoid A and B and an overrun clutch solenoid (also called control valve control solenoid) C through a hydraulic circuit 17.

The manual valve 14 is manually operated through a select lever (not shown) according to a running form that a vehicle driver desires. When the vehicle driver desires a parking or vehicle stop to scan the select lever of the transmission to a P (N) range, the manual valve 14 does not supply the line pressure $P_L$ at the circuit 13 to every output circuit and drains all of the line pressure therethrough.

In addition, when the vehicle driver desires an automatic gear shifting run to set the select lever to a D range, the line pressure $P_L$ of the circuit 13 is output to a circuit 19 as a D range pressure $P_D$ and the line pressure in all of the other output circuits is drained through the manual valve 14.

When the vehicle driver desires the engine braking at the second speed to set the select lever to a 2 range, the manual valve 14 serves as follows; the line pressure $P_L$ of the circuit 13 is output to the circuit 20 as a 2 range pressure $P_2$ and the line pressure of the other output circuits is drained. When the vehicle driver desires the engine braking at the first speed range to set the select lever to a 1 range, the manual valve 14 outputs the line pressure of the circuit 13 to a circuit 21 as a 1 range pressure $P_1$ and drains the line pressure at the other output circuits therethrough.

Furthermore, the manual valve 14, when the vehicle driver desires a reverse run to set the select lever to the R range, serves as follows; the line pressure at the circuit 13 is output to the circuit 22 as an R range pressure and the line pressure of all of the other output circuits is drained therethrough.

The D range pressure circuit 19, on the one hand, is connected to a forward clutch control valve 18, which valve 18 serves to communicate the circuit 23 with the D range pressure circuit 19 at a position of a spool 18a shown in FIG. 2 and serves to switch to connect the circuit 23 to the 2 range pressure circuit 20 at a position of the spool 18a lowered from the position shown in FIG. 2.

The valve 18 is always acted upon the pilot pressure $P_P$ of the circuit 17 at the upper end of the spool 18a and the pressure from the spring 18b and circuit 24 is acted upon in a reverse direction. Depending upon a presence or absence of the pressure from the circuit 24, a stroke of the spool 18a is controlled between the position shown in FIG. 2 and the lowered position described above.

The D range pressure circuit 19, on the other hand, is connected to a switch valve 16, an overrun clutch control valve 25, and D range gear shift control oil circuit (not shown). Thus, the D range pressure circuit 19 achieves the hydraulic pressure supply logic shown by a circle o of Table of FIG. 1(B) according to an ON and OFF of shifting solenoids A and B shown in FIG. 3 so that the gear shift range from the first speed range to the fourth speed range can automatically be selected.

However, when the shifting solenoids A and B are in the ON states, respectively, the pilot pressure $P_P$ of the circuit 17 is output as a gear speed range signal to the circuits 26 and 27, and when they A and B are in the OFF states, respectively, the working pressures off the circuits 26 and 27 are drained through the corresponding solenoids.

A switching valve 16 is acted upon a fourth speed selection pressure $P_4$ of a circuit 28 at an upper end of a spool 16a and is acted upon the 2 range pressure $P_2$ from a spring 16b and a circuit 20 in a reverse direction to the fourth speed range selection pressure. The switching valve 16 serves to communicate a circuit 24 from the forward clutch control valve 18 to a line pressure circuit 13 at a position of a spool 16a shown in FIG. 2, serves to communicate a circuit from an overrun clutch control valve 25 to a circuit 30 from a control valve control solenoid C, and serves to switch to connect the circuit 24 to a circuit 30 and to connect a circuit 29 to the D range pressure circuit 19 at the lowered position of the spool 16a.

It is noted that the 4th speed selection pressure $P_4$ of the circuit 29 is a pressure generated when the fourth speed range is to be selected in the automatic gear shifting mode and this pressure is supplied to a 4th speed range servo apply chamber 4A of a band brake B/B when an overrun clutch control valve 25 serves to communicate the circuit 31 to the circuit 28 so that the fourth speed range can be selected. In addition, the control valve control solenoid C is the same as the shifting solenoids A and B. When the solenoid C is in the ON state, the pilot pressure of the circuit 17 is output to a circuit 30. When the solenoid C is in the OFF state, the working pressure in the circuit 30 is drained therethrough.

The overrun clutch control valve 25 is acted upon the 1 range pressure $P_1$ of the spring 24a and circuit 21 at an upper end of the spool and is acted upon the pressure of the circuit 29 in its reverse direction.

When the spool is placed at the lowered position, the circuit 28 is communicated to a drain port 25c and a circuit 32 from the overrun clutch OR/C is communicated to the D range pressure circuit 19.

When the spool is placed at an elevated position, both circuits 28 and 32 are switched and connected to the circuit 31 and drain port 25c, respectively.

An operation of the first embodiment will be explained below.

The solenoids A, B, and C are controlled so that a predetermined gear shifting and engine braking control is executed by means of a controller 41 as follows:

When the manual valve 14 is placed at the D range position in the automatic gear shifting running mode, the controller 41 determines an appropriate gear shifting range according to a running state from its input information.

Figure 3:
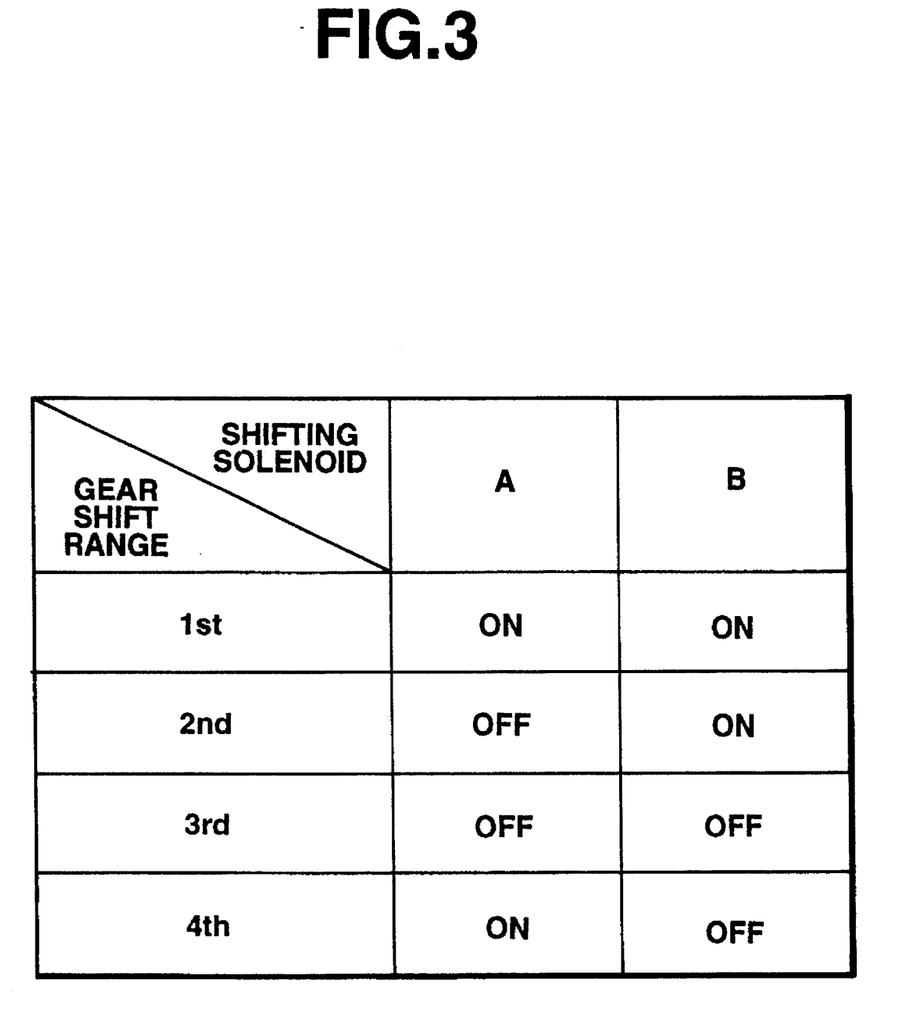
FIG. 3 is a logic table representing a relationship between ON and OFF states of a shifting solenoid in the gear speed range shift control apparatus and selected gear speed range.

To place the appropriate gear shifting range, the speed range from the first speed range to the second speed range is selected according to the logic shown in the table of FIG. 1(B) when the solenoids A and B are in the ON and OFF states shown in FIG. 3.

When the speed range from the first to the third speed ranges is selected, the fourth speed selection pressure $P_4$ is not generated and the switching valve 16 places the spool 16a to the elevated position shown in FIG. 3 so that both circuits 24 and 29 are communicated with the circuits 13 and 30. Thus, the line pressure is supplied to the circuit 24 so that the forward clutch control valve 18 places the spool 18a at the elevated position shown in FIG. 3 so that the D range pressure output to the circuit 19 is communicated to the forward clutch F/C via the control valve 18 and a circuit 23 to maintain it in the engagement state so that the selection of the speed range from the first to the third speed ranges can be achieved.

A one-way orifice 33 and an accumulator 34 are sequentially inserted in the circuit 23, thus a working oil pressure of the forward clutch F/C being gradually increased.

Thus, the engagement of the forward clutch F/C does not become steep. An engagement shock, namely, a so-called N→D selecting shock can be relieved when the forward clutch F/C is engaged from the released state by the switching of the manual valve 14 from the P (N) range to the D range through the select lever (not shown).

In the first embodiment, the accumulator 34 includes an accumulator stroke inhibit circuit 35 which introduces a working pressure of the high clutch H/C as a pressure present at the third speed and fourth speed ranges, as appreciated from the table of FIG. 1(A), so that when the gear speed range is at the third speed range or at the fourth speed range and the gear speed range is switched from the fourth speed range to the third speed range, the accumulator 34 is maintained at a stroke disabled state for a purpose to be described later.

When the vehicle runs in a running condition which requires the engine braking at the first, second, and third speed ranges, the controller 41 determines it so that the solenoid C is in the OFF state and the working pressure in the circuit 30 is drained. Then, the working pressure in the circuit 29 is also drained which is communicated with the circuit 30 so that the overrun clutch control valve 25 serves to communicate the circuit 32 to the D range pressure circuit 19 so as to engage the overrun clutch OR/C, thereby achieving the automatic engine braking.

However, while the engine braking is not necessary, the solenoid C is in the ON state so that the pilot pressure is supplied to the circuit 30 and to the valve 25 via the circuit 29, the valve 25 serving to communicate the overrun clutch OR/C to the drain port 25c so as to release the clutch OR/C and serving to communicate the circuit 28 to the circuit 31.

Hence, if the fourth-speed selection pressure $P_4$ is generated in the circuit 31, this pressure is transmitted from the circuit 28 to the chamber 4A of the band brake B/B so that the engagement of the band brake permits the fourth speed range to be selected.

The fourth speed range selection pressure $P_4$ is acted upon an upper end of the switching valve 16 in the fourth speed range selection state and the 2 range pressure $P_2$ acted upon the lower end of the switching valve 16 is not present at the D range. Therefore, the switching valve 16 is placed at the lower position so that the circuits 24 and 29 are switched to the circuits 30 and 19, respectively.

The communication between the circuits 24 and 30 permits the control of the forward clutch control valve 18 by means of the solenoid C and the communication between the circuits 29 and 19 permits the overrun clutch control valve 25 to be held at the elevated position so that the engagement holding (fourth speed selection and/or holding) of the band brake B/B by means of the fourth speed range pressure $P_4$ and lowered position holding of the switching valve 16 become possible.

The controller 41 turns off the solenoid C in the fourth speed range selection state.

Thus, the working pressure drain from the circuit 30, hence, the drain from the circuit 24 causes the forward clutch control valve 18 to be at the lowered position so that the circuit 23 is switched and connected to the circuit 20.

Since the working pressure in the 2 range pressure circuit 20 is drained at the D range, the working pressure of the forward clutch F/C is drained and the working pressure therein can thus be released. As described above, the forward clutch F/C which does not contribute to the power transmission at the fourth speed range is in the non-operation state. Thus, the friction of the forward one way clutch FO/C is prevented so as to improve the fuel consumption as described above with reference to FIG. 1(A) and FIG. 1(B).

Next, the down-shifting from the fourth speed range to the third speed range related to the present invention will be explained below.

When the down-shifting occurs, the controller 41 switches the shifting solenoid A from the ON state to the OFF state, as appreciated from the logic table of FIG. 3.

The OFF state of the shifting solenoid A reduces the fourth speed pressure $P_4$ of the circuit 31. At the instantaneous time when the reduction of the fourth speed range pressure becomes a set pressure determined according to a set weight of the spring 16b the switching valve 16 is switched to the position shown in FIG. 2 by means of the spring 16b so that both circuits 13 and 24 and both circuits 29 and 30 can be communicated together, respectively.

The opening of the circuits 13 and 24 causes the forward clutch control valve 18 to be switched at the position shown in FIG. 2 so that the engagement pressure $P_{F/C}$ of the forward clutch F/C is elevated for this clutch to be engaged.

The increase in the engagement pressure $P_{F/C}$ of the forward clutch F/C is also speedily advanced according to a presence of the accumulator 34 for the prevention of the N→D selection shock since the accumulator 34 is held at the position of FIG. 2 due to the working pressure of the high clutch H/C and the stroke of the accumulator 34 is disabled, as described above when the down shifting occurs.

Hence, an instantaneous neutral state of the automatic power transmission can be avoided due to the engagement delay of the forward clutch. In addition, the involved delay of the gear range shifting operation, the excessive high revolution of the engine with the transmission in the neutral state and the accelerator pedal depressed, and a large gear shift shock can accordingly be prevented.

(Second Preferred Embodiment)

Figure 4:
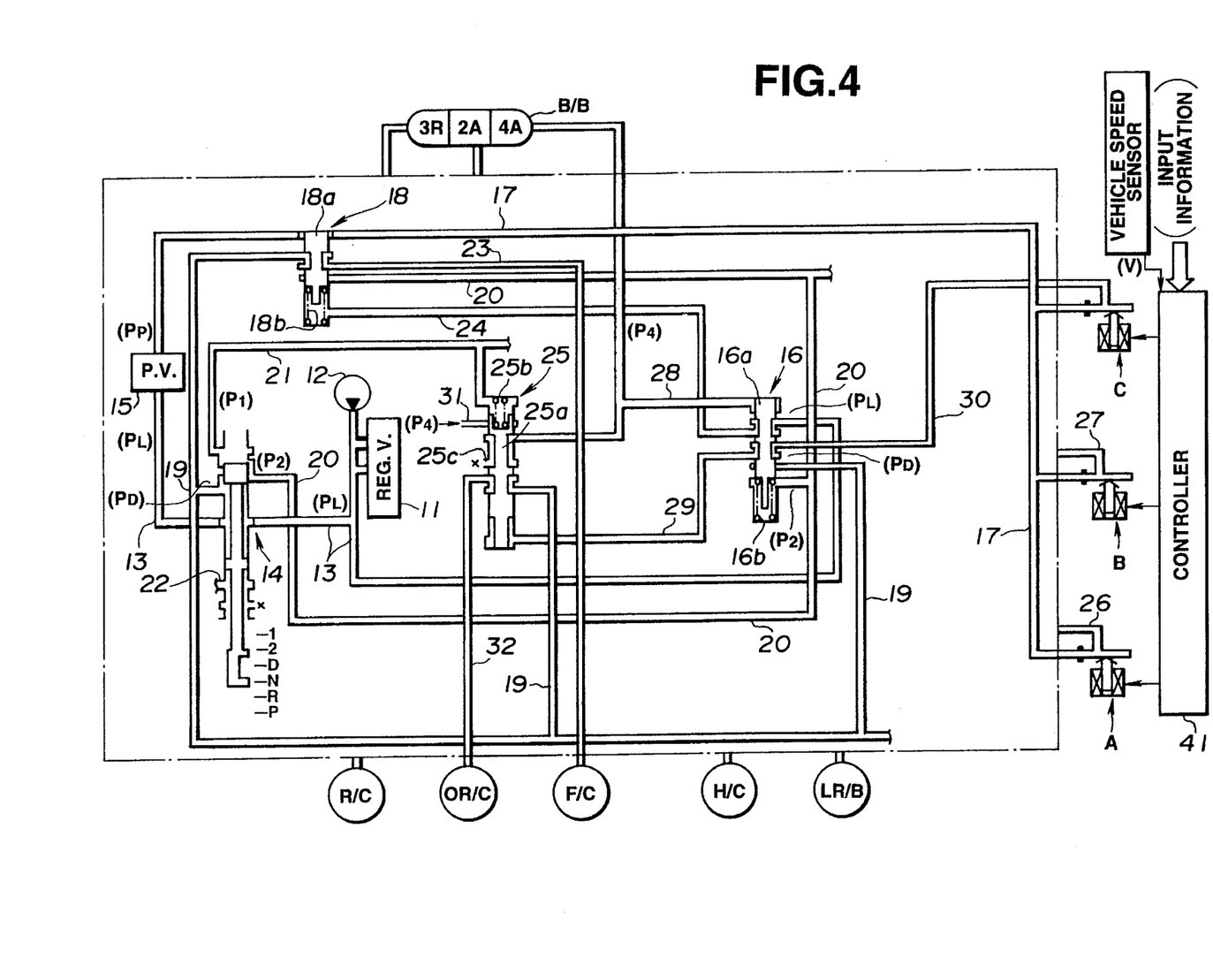
FIG. 4 is a hydraulic circuit diagram of a gear speed range shift control apparatus indicating only a related portion to the present invention in a second preferred embodiment according to the present invention.

FIG. 4 shows a second preferred embodiment of the gear shifting range control circuit of the automatic power transmission to which the present invention is applicable.

It is noted that the power transmission train of the second embodiment is the same as that in the first embodiment shown in FIGS. 1(A) and 1(B).

Although FIG. 4 is almost the same as FIG. 2, the accumulator 34 and accumulator stroke inhibit circuit 85 are eliminated, but a vehicle speed sensor 42 to detect a vehicle speed V is added and connected to the controller 41.

In the second preferred embodiment, the release and engagement controls of the forward clutch F/C in the fourth speed selection state are carried out. At this time, the controller 41 executes a control program shown in FIG. 5 to control the release and engagement of the forward clutch F/C as will be described below.

Figure 5:
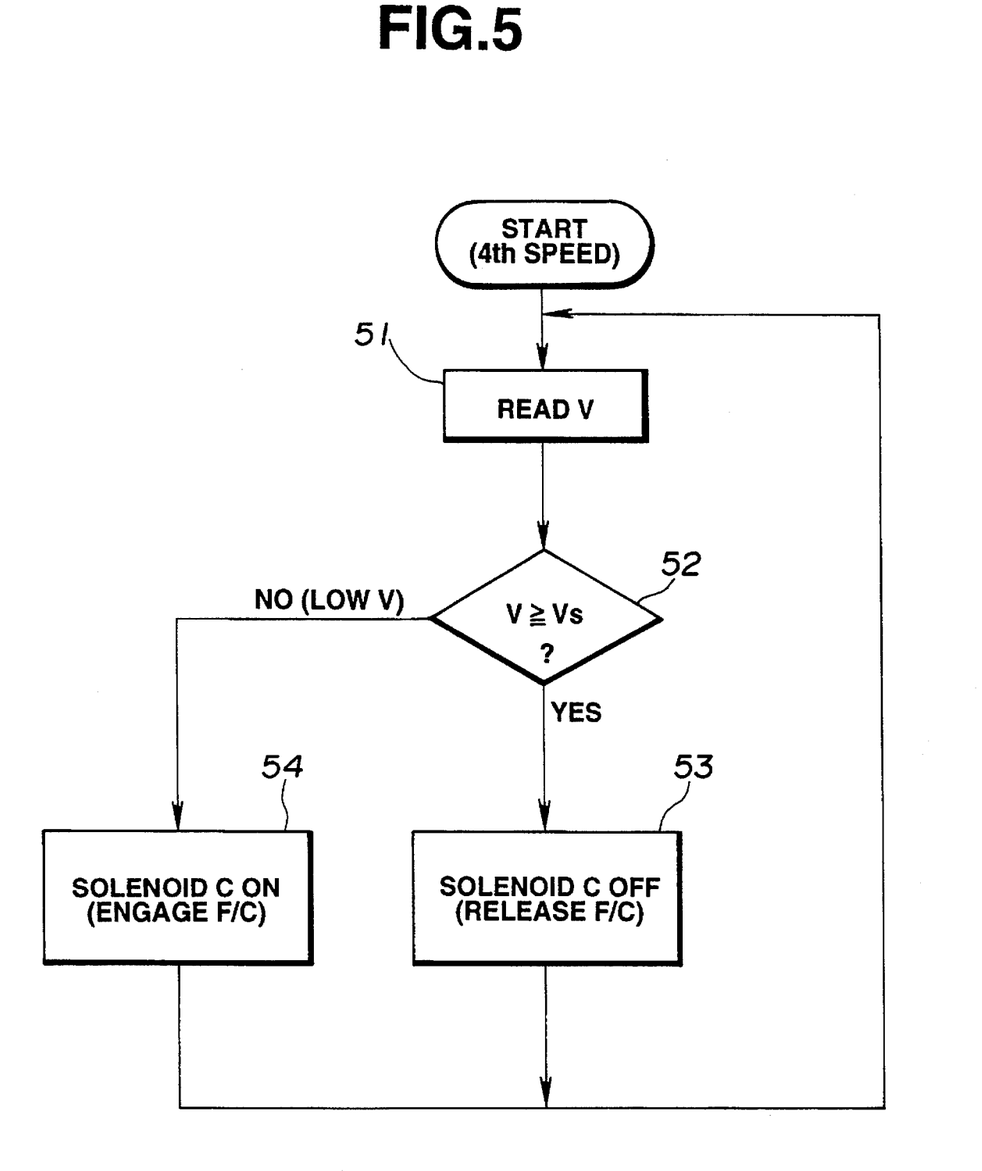
FIG. 5 is an operational flowchart representing a forward clutch engagement (F/C) control program during a down shifting from a fourth speed range to a low gear speed range according to which a controller executes the program.

That is to say, the program of FIG. 5 is executed and repeated whenever the gear shifting range is selected to the fourth gear speed range.

At a step 51, the controller 41 reads the vehicle speed V, at a step 52, the controller 41 checks to see whether the vehicle speed V is a speed equal to or higher than a set vehicle speed Vs or a speed lower than the set vehicle speed Vs. The set vehicle speed Vs is an upper limit value of a vehicle speed region in which when the solenoid C is turned in the OFF state in order to make inoperative the forward clutch F/C which does not contribute to the power transmission in the fourth speed range selection state, the oil quantity drained from the solenoid C causes the environment of supply and drain of the oil quantity through the pump 12 to be driven by means of the engine to be strict. Hence, in a high speed range in which the vehicle speed V is equal to or higher than the set vehicle speed Vs, the rotation of the pump 12 is sufficient and the supply and drain environment of the pump 12 is favorable. Thus, even if the engine revolution speed is reduced due to the lock up of the torque converter 1, the supply and drain environment of the oil quantity is held in the favorable state. In a lower vehicle speed range below the set vehicle speed Vs, when the engine revolution speed is reduced due to the lock up of the torque converter 1, the drained oil quantity from the solenoid C makes the supply and drain environment strict.

In the higher vehicle speed range, at a step 53, a release of the forward clutch F/C is executed by a drainage (OFF) of the control valve control solenoid C as usual as described above so that the friction of the forward one way clutch FO/C is eliminated and improvement of the fuel consumption is carried out.

On the other hand, in the lower vehicle speed range, at a step 54, the control valve control solenoid C is turned in the ON state so that the drainage of the oil quantity from the solenoid C is inhibited (the release of the forward clutch F/C is inhibited) so that the supply and drain environment of the pump 12 does not become strict caused by the drained oil quantity from the solenoid C.

Hence, when the lock-up region of the torque converter 1 is defined which introduces the reduction of the engine revolution (pump oil quantity reduction), it is not necessary to set the vehicle speed lower limit value to a higher valve so that the longer lock-up interval can be maintained. Consequently, the fuel consumption can be improved.

According to the above-described control, since the release of the forward clutch F/C can be inhibited, the Fuel consumption improvement due to the prevention of the friction of the forward one way clutch FO/C cannot be achieved. However, since the fuel consumption improvement effect due to the elongated lock-up interval is larger, the fuel consumption improvement effect can be achieved according to the difference between them.

(Third Preferred Embodiment)

Figure 6:
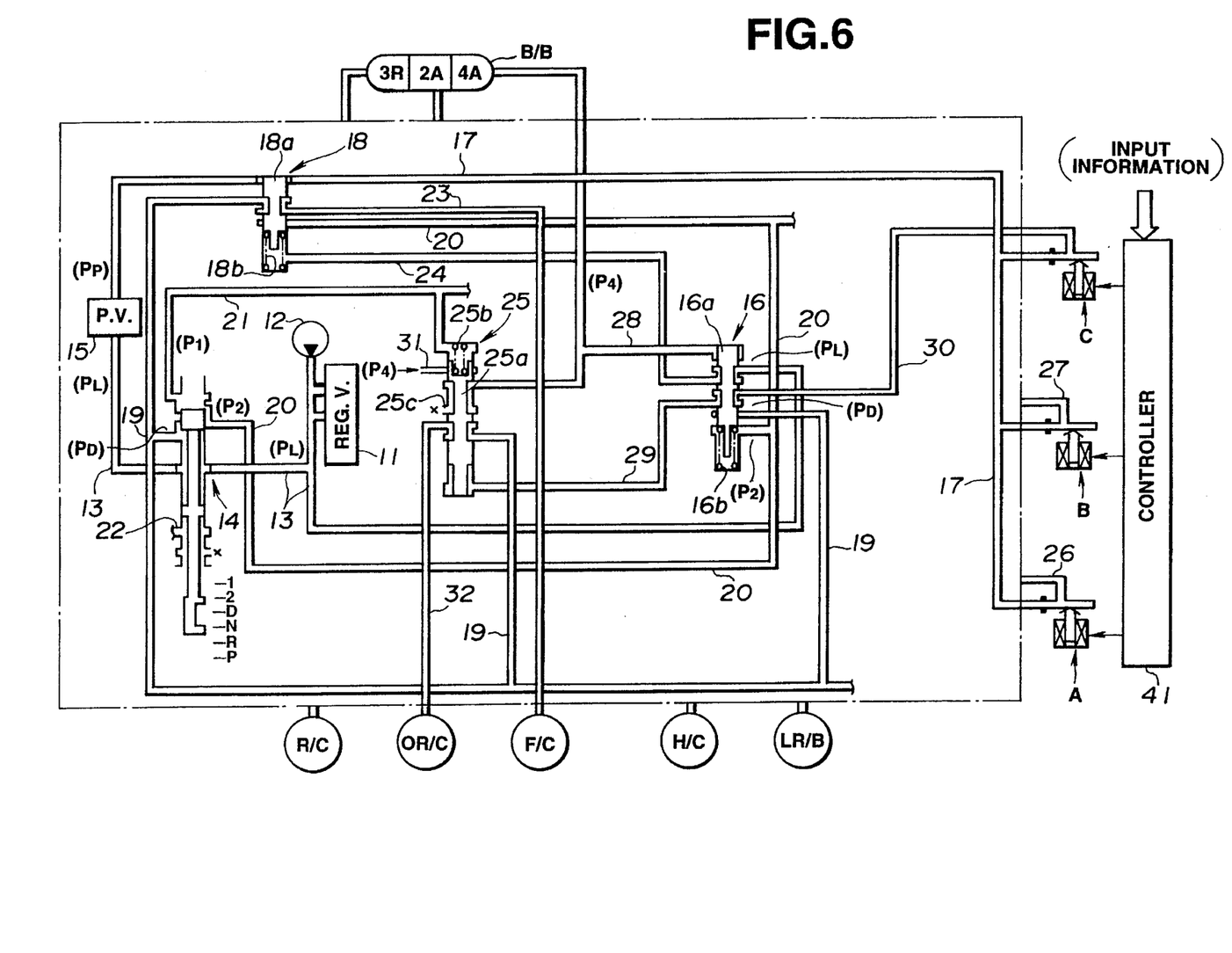
FIG. 6 is a hydraulic circuit diagram of a gear speed range shift control apparatus in the power train indicating only a related portion to the present invention in a third preferred embodiment according to the present invention.

FIG. 6 shows a third preferred embodiment of the gear shifting range control circuit of the automatic power transmission to which the present invention is applicable.

It is noted that the power transmission train in the third embodiment is the same as that shown in FIGS. 1(A) and 1(B), and frictional elements are the same as those in the case of the first embodiment.

As shown in FIG. 6, the structure of the gear shifting range control circuit is almost the same as that shown in FIG. 2 except for the accumulator 34 and inhibit circuit 35.

Figure 7:
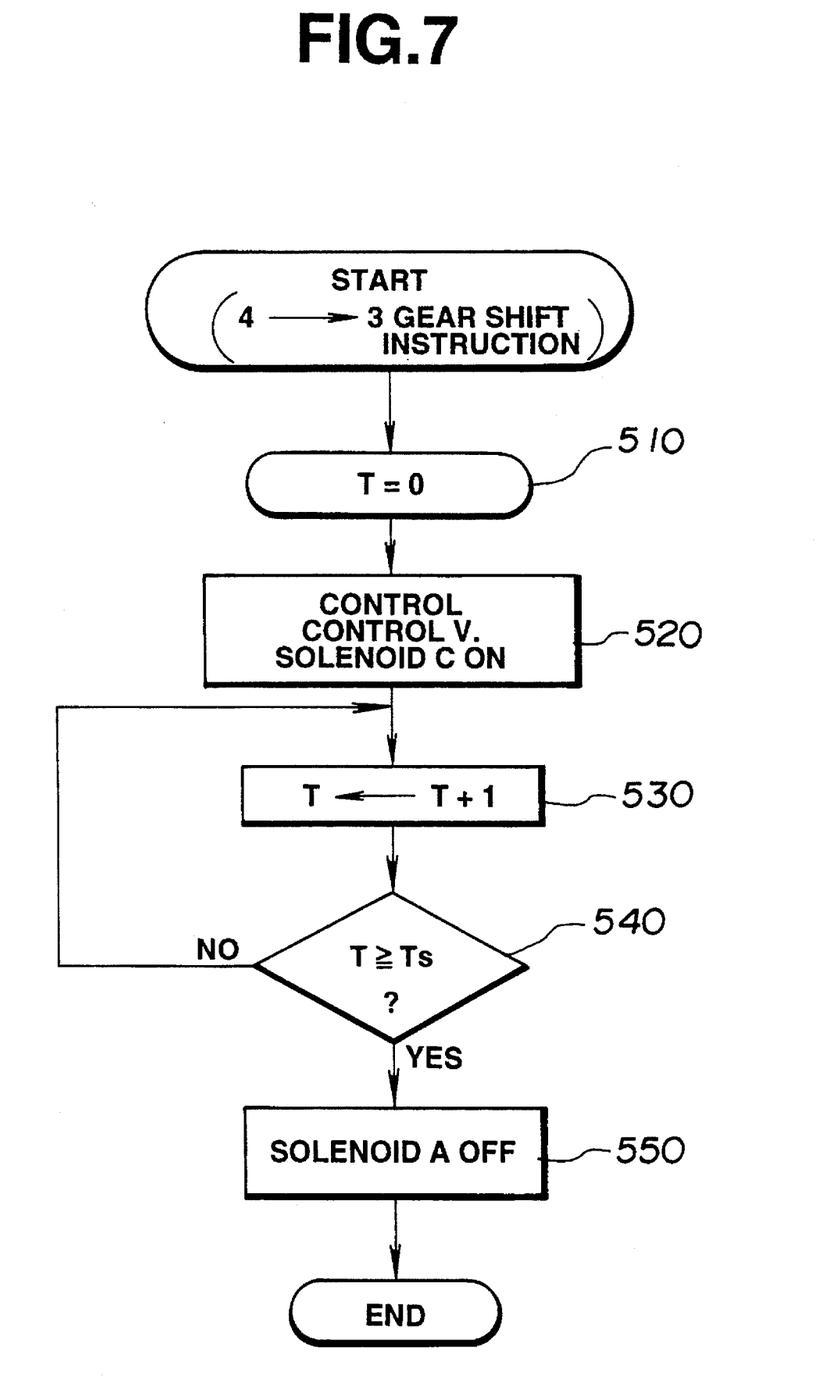
FIG. 7 is an operational flowchart executed by the controller shown in FIG. 6 indicating a control program when the gear speed range is down shifted from the 4-th speed range to the 3-rd speed range.
Figure 8:
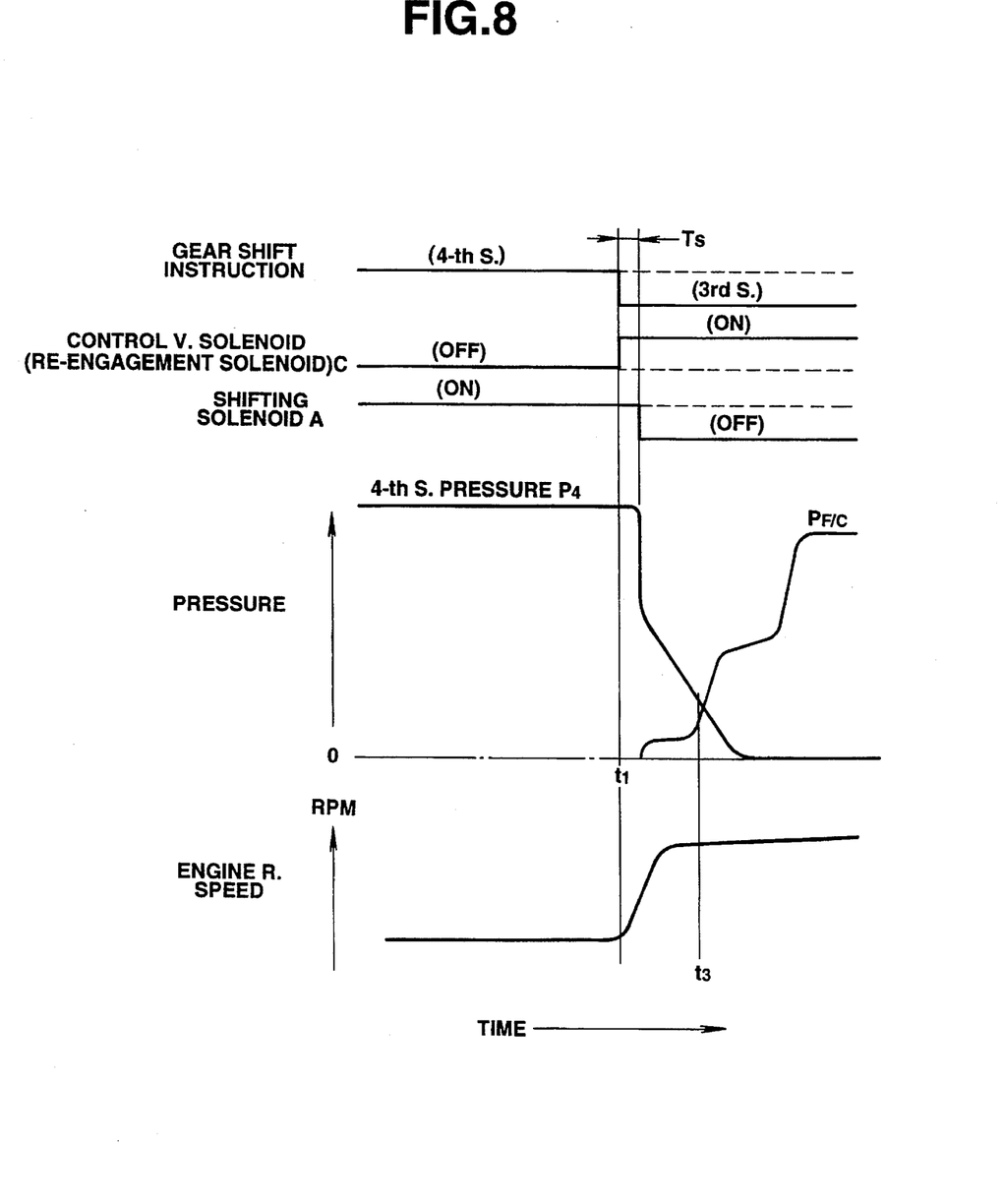
FIG. 8 is an operational timing chart of the automatic power transmission according to the gear speed shift control apparatus shown in FIGS. 6 and 7.

In the third embodiment, the controller 41 executes a program shown in FIG. 7 during the down gear shifting range from the fourth speed range to the third speed range as shown in FIG. 8.

That is to say, when the vehicle runs in a state where the third speed range is to be selected from the fourth speed range selection state, the controller 41 issues a fourth→third gear shifting instruction at an instantaneous time $t_1$ of FIG. 5. At this time, the controller 41 resets a timer T which measures a passed time from a time at which the gear shift instruction is issued, at a step 510 of FIG. 7. At the next step 520, the control valve control solenoid C is turned to the ON state. Thereafter, when the timer T indicates the passed time of a set time Ts from the time $t_1$ at which the gear shift instruction is issued at the subsequent steps 530 and 540, the routine goes to a step 550 in which the controller 41 executes the OFF state (refer to the logic table of FIG. 3) of the shifting solenoid A to advance to the gear shifting operation as shown in FIG. 8.

When the control valve control solenoid C is turned to the ON state, the signal pressure from the control valve control solenoid is supplied to the forward clutch control valve 18 via the switching valve 16 which is initially at the elevated position when it is turned to ON so that the forward clutch control valve 18 is switched to the elevated position.

Thus, the D range pressure of the circuit 19 is passed from the circuit 23 to the forward clutch F/C, and the engagement pressure $P_{F/C}$ of the forward clutch F/C is elevated as shown in FIG. 8 to advance the engagement.

On the other hand, the OFF state of the shift solenoid A to be executed after a set time Ts from the ON state of the control valve control solenoid C reduces the fourth speed pressure $P_4$ of the circuit 31 as shown in FIG. 8, so that the switching valve 16 is switched at the elevated position of FIG. 6 by means of the spring 16b when the pressure becomes a set pressure so that the communication between the circuits 13 and 24 and the communication between the circuits 29 and 30 are established.

The opening of the circuits 13 and 24 causes the forward clutch control valve 18 to be held at the elevated position of FIG. 6 under the line pressure from the circuit 13. The forward clutch engagement pressure $P_{F/C}$ is furthermore elevated as shown in FIG. 8 so that the clutch is furthermore advanced and engaged. The reduction of the fourth speed pressure $P_4$ causes the band brake B/B to be released. Thus, the down shifting of 3→4 is completed together with the reengagement of the forward clutch F/C.

Since the switching of the control valve control solenoid C which carries out the reengagement of the forward clutch F/C is preexecuted during the down gear shifting and thereafter the switching of the shifting solenoid A which advances the down gear shifting is carried out, the timings of the reengagement of the forward clutch F/C and the advance of the gear range shift can be adjusted irrespective of the tendency of delaying of the engagement of the forward clutch F/C due mainly to the magnitude of the working cylinder capacity and the accumulator (not shown in FIG. 6) for preventing the engagement shock present in the forward clutch pressure circuit 23.

The excessive revolution of the engine during a temporary transition state in which the transmission is neutral and with the accelerator pedal depressed can be prevented, as appreciated from the engine revolution change of FIG. 8, and a large gear shift shock involved in the engine excessive run in the neutral state of the transmission can be avoided.

In the sense of the meaning, it is preferable to make the set time Ts correspond to the engagement delay time of the forward clutch F/C.

In the third embodiment, the compensation of reengagement delay of the forward clutch F/C is explained above for the 4→3 down-shifting operation. The same compensation for the down-shifting from the fourth speed range to the other lower speed range can be achieved. The engine excessive revolution during the neutral state of the transmission and the large gear shifting shock can be prevented.

In the third embodiment described above, when the OFF state of the shifting solenoid A is delayed with respect to the ON state of the control valve control solenoid C, the passed time from the time at which the down gear shifting instruction is issued is monitored. Until the passed time becomes the set time Ts, the OFF state of the shifting solenoid A is delayed. Alternatively, the working pressure of the forward clutch F/C may be monitored and the OFF state of the shifting solenoid A may be delayed until a value of the monitored working pressure indicates the start of the engagement thereof.

(Effects)

In the first embodiment, since the circuit 35 is installed which disables the stroke of the accumulator 34 to which the pressure (the working pressure of the high clutch H/C) present during the gear range shifting from the higher speed range to the lower speed range is introduced, the working pressure of the certain frictional element to be engaged from the released state when the gear speed range is shifted from the higher speed range to the lower speed range can speedily be increased due to the presence of the accumulator 34, and the engagement delay of the certain frictional element can be avoided. Hence, the excessive run of the engine during the neutral state of the power transmission, the gear shifting delay, and involved shifting shock due to the engagement delay of the certain frictional element can be avoided.

In the second embodiment, when the controller 41 detects that the vehicle speed V is below the set vehicle speed, the controller 41 inhibits the release of the certain frictional element (forward clutch F/C). Therefore, although the fuel consumption improvement effect which can be achieved by releasing the certain frictional element to prevent the friction of the one way clutch cannot be obtained, it becomes unnecessary to render the signal pressure of the forward clutch control valve 18 zero (its basic pressure is drained). Accordingly, the supply and drain environment of the working fluid of the pump 12 to be driven by the engine becomes favorable although the engine revolution speed becomes low due to the higher gear speed range. In addition, it becomes unnecessary to set the lower limit vehicle speed of the lock-up region of the torque converter 1 which would cause the reduction of the engine revolution speed higher and the extension of time of the lock-up interval can improve the fuel consumption.

Since the effect of fuel consumption improvement caused by the extension of time of the lock-up interval is superior to the effect thereof caused by the prevention of the friction of the one way clutch, the fuel consumption can, in total, be saved by the difference between the former effect and the latter effect even at the sacrifice of the latter effect of on fuel consumption.

In the third embodiment, the controller 41 has response delay means for responding the shifting solenoid A to the down gear shifting instruction later than the response of the reengagement solenoid to the down shifting instruction. Therefore, even if the reengagement of the certain frictional element (forward clutch F/C) tends to be delayed, the gear shifting is not advanced earlier than the reengagement of the certain frictional element. Consequently, the excessive revolutions of the engine with the automatic power transmission instantaneously in the neutral state and the involved large shift shock do not occur any more.

It is noted that all or two of concepts of the First, second, and third embodiments can be combined together.

It will fully be appreciated by those skilled in the art that the foregoing description has been made to the preferred embodiment and various changes and modifications may be made without departing from the scope of the present invention which is to be defined by the appended claims.

What is claimed is:

1. An automatic power transmission for an automotive vehicle with an engine, comprising:
   a) a certain frictional element;
   b) a one way clutch;
   c) an accumulator;
   d) an engine braking frictional element;
   e) gear speed range shifting means for shifting a gear speed range between a higher gear shift range and a lower gear shift range, said gear speed range shifting means including,
      first means for selectively setting the lower gear shift range in which an output power of the engine is transmitted via said certain frictional element and said one way clutch when said certain frictional element is engaged under a hydraulic pressure such that said accumulator serves to slow a pressure raising speed toward said certain frictional element;
      second means for enabling braking of the engine at the lower gear shift range when the engine braking frictional element is engaged which is juxtaposed to said one way clutch when the lower gear speed range is selected;
      third means for enabling the higher gear shift range to be selected when said one way clutch overruns with another frictional element engaged when the lower gear shift range is selected; and
      fourth means for releasing the engagement of said certain frictional element in the higher gear shift range so as to prevent a friction to be generated on the one way clutch; and
   f) fifth means for increasing a rate of raising the hydraulic pressure to said certain frictional element so as to make fast a reengagement of said certain frictional element and so as not to provide a temporary neutral state in the automatic power transmission when a down shifting from the higher gear shift range to the lower gear shift range occurs, wherein said certain frictional element is a forward clutch.

2. An automatic power transmission for an automotive vehicle as set forth in claim 1, wherein said certain frictional element is used for selecting the lower gear shift range, said one way clutch is a forward one way clutch (FO/C), and wherein said fifth means includes an accumulator stroke inhibit circuit which operatively introduces a hydraulic pressure present in a hydraulic circuit to said accumulator so as to disable a stroke of said accumulator when the down shifting from the higher gear shift range to the lower gear shift range occurs.

3. An automatic power transmission for an automotive vehicle as set forth in claim 1, wherein said certain frictional element is used for selecting the lower gear shift range, said one way clutch is a forward one way clutch (FO/C), and wherein said fifth means includes response delay means for retarding a time at which a shifting solenoid (A) is turned from an ON state to an OFF state in response to an instruction to shift from the higher gear shift range down to the lower gear shift range than a time at which a control valve control solenoid (C) to reengage said forward clutch (F/C) is turned from an OFF state to an ON state in response to the instruction to shift from the higher gear shift range down to the lower gear shift range.

4. An automatic power transmission for an automotive vehicle as set forth in claim 1, further comprising:
   sixth means for detecting a vehicle speed (V);
   seventh means for detecting whether the detected vehicle speed (V) is below a set vehicle speed (Vs) and outputting a low vehicle speed signal upon detecting that the detected vehicle speed (V) is below said set vehicle speed (Vs); and
   certain frictional element release inhibiting means for inhibiting the release of said certain frictional element in the higher gear speed range during the output of the low vehicle speed signal.

5. An automatic power transmission for an automotive vehicle as set forth in claim 2, wherein said accumulator is disposed in a hydraulic circuit connected to said forward clutch (F/C) and to a forward clutch control valve (18) and said accumulator stroke inhibiting circuit is disposed between said accumulator and the hydraulic circuit connected to a high clutch (H/C) which serves to couple a carrier (4C) rotatably supporting a pinion (4P) to an input axle (2) of the automatic power transmission, said carrier (4C) and pinion (4P) constituting a planetary gear group.

6. An automatic power transmission for an automotive vehicle as set forth in claim 5, wherein said forward clutch control valve (18) operatively communicates a D range pressure hydraulic circuit having a D range pressure ($P_D$), which is connected to a manual valve (14), with said hydraulic circuit connected to said forward clutch via said accumulator when a shifting solenoid (A) is turned from an ON state to on OFF state in response to an instruction to shift from the higher gear shift range to the lower gear shift range.

7. An automatic power transmission for an automotive vehicle as set forth in claim 3, wherein said response delay means includes a timer (T), and wherein a control valve control solenoid (C) is first turned from an OFF state to an ON state so that a forward clutch control valve is operated to communicate a hydraulic circuit having a D range pressure ($P_D$) with a hydraulic circuit connected to the forward clutch (F/C) at a same time when the instruction to shift from the higher gear shift range to the lower gear shift range is issued and when said timer (T) is reset and thereafter the shifting solenoid (A) is turned from the ON state to the OFF state after the timer (T) indicates a set passed time (Ts).

8. An automatic power transmission for an automotive vehicle as set forth in claim 7, wherein when the shifting solenoid (A) is turned from the ON state to the OFF state, a 4th speed range hydraulic pressure of a second hydraulic circuit (31) is reduced and reached to a set pressure of a switching valve (16) so that both a first and a second circuit (13, 24) and both a third and fourth circuit (29, 30) are communicated, respectively;

and wherein the opening between the first and second circuits (13, 24) causing the forward clutch control valve to be elevated receiving a line pressure ($P_L$) from the first circuit (13) so that a forward clutch engaging pressure $P_{F/C}$ is raised to further advance the reengagement of said forward clutch, the reduction of the 4th speed range hydraulic pressure causing a band brake (B/B) to be released.

9. An automatic power transmission for an automotive vehicle as set forth in claim 8, wherein said set passed time (Ts) corresponds to a reengagement delay time of the forward clutch (F/C).

10. An automatic power transmission for an automotive vehicle as set forth in claim 3, wherein the response delay means includes monitoring means for monitoring a working pressure of the forward clutch and the shifting solenoid (A) is retardingly turned from the ON state to the OFF state until the monitored working pressure indicates a value at which the reengagement of the forward clutch (F/C) is started.

11. An automatic power transmission for an automotive vehicle as set forth in claim 4, wherein said certain frictional element is a forward clutch (F/C) and said certain frictional element release inhibiting means includes a controller which turns a control valve control solenoid (C) from an OFF state to an ON state so that a drain of oil quantity from the control valve control solenoid (C) is inhibited to inhibit the release of the forward clutch (F/C) so that a drained oil quantity from said control valve control solenoid (C) causes an oil quantity supply and a drain environment of an oil pump (12) not to become strict and a lock-up interval of a torque converter of said automatic power transmission is elongated.

12. An automatic power transmission for an automotive vehicle with an engine, comprising:

a) a forward clutch b) a forward one way clutch;

c) an accumulator;

d) an engine braking frictional element;

e) gear speed range shifting means for shifting a gear speed range between a higher gear shift range and a lower gear shift range, said gear speed range shifting means including, first means for selectively setting the lower gear shift range in which an output power of the engine is transmitted via said forward clutch and said forward one way clutch when said forward clutch is engaged under a hydraulic pressure such that said accumulator serves to slow a pressure raising speed toward said forward clutch;

second means for enabling braking of the engine at the lower gear shift range when the engine braking frictional element is engaged which is juxtaposed to said forward one way clutch when the lower gear speed range is selected;

third means for enabling the higher gear shift range to be selected when said forward one way clutch overruns with another frictional element engaged when the lower gear shift range is selected; and fourth means for releasing the engagement of said forward clutch in the higher gear shift range so as to prevent a friction to be generated on the forward one way clutch; and f) fifth means for making earlier a timing at which said forward clutch is reengaged than a timing at which a down shift to the lower gear shift range is advanced when a down shifting from the higher gear shift range to the lower gear shift range occurs.

* * * * *